United States Patent
Becker et al.

(10) Patent No.: US 8,461,221 B2
(45) Date of Patent: Jun. 11, 2013

(54) SILICONE ANTIFOAM PARTICLES

(75) Inventors: Richard Becker, Burghausen (DE); Herbert Siegl, Burghausen (DE)

(73) Assignee: Wacker Chemie AG, Munich (DE)

( * ) Notice: Subject to any disclaimer, the term of this patent is extended or adjusted under 35 U.S.C. 154(b) by 380 days.

(21) Appl. No.: 12/774,020

(22) Filed: May 5, 2010

(65) Prior Publication Data

US 2010/0292353 A1 Nov. 18, 2010

(30) Foreign Application Priority Data

May 18, 2009 (DE) .......................... 10 2009 003 187

(51) Int. Cl.
*C04B 28/02* (2006.01)
(52) U.S. Cl.
USPC ............. 521/55; 521/134; 521/136; 521/186; 521/187; 521/188
(58) Field of Classification Search
USPC .................... 521/134, 136, 186, 187, 188, 55
See application file for complete search history.

(56) References Cited

U.S. PATENT DOCUMENTS

| | | | |
|---|---|---|---|
| 4,561,992 A | 12/1985 | Troeger et al. | |
| 4,563,187 A | 1/1986 | Mesmer et al. | |
| 4,919,843 A | 4/1990 | Innertsberger et al. | |
| 5,589,449 A | 12/1996 | Kolaitis et al. | |
| 6,197,914 B1 | 3/2001 | Kaeppler et al. | |
| 6,605,183 B1 | 8/2003 | Rautschek et al. | |
| 2006/0020082 A1* | 1/2006 | Rautschek et al. | ............ 524/863 |
| 2006/0142175 A1 | 6/2006 | Haiss et al. | |
| 2008/0021152 A1 | 1/2008 | Rautschek et al. | |

FOREIGN PATENT DOCUMENTS

| | | | |
|---|---|---|---|
| CN | 1745167 A | | 3/2006 |
| CN | 1950136 A | | 4/2007 |
| DE | 69421462 T2 | | 3/2000 |
| DE | 10 2004 040 263 A1 | | 2/2006 |
| EP | 0301531 A2 | | 2/1989 |
| EP | 0 323 532 A1 | | 7/1989 |
| EP | 0636684 | * | 7/1993 |
| EP | 0927733 A1 | | 7/1999 |
| EP | 1076073 A1 | | 2/2001 |
| GB | 2 001 099 A | | 1/1979 |
| KR | 10-2005-0099508 A1 | | 10/2005 |
| KR | 10-0790434 B1 | | 1/2008 |
| WO | 2004069981 A2 | | 8/2004 |
| WO | 2005123892 A1 | | 12/2005 |
| WO | 2006018145 A1 | | 2/2006 |
| WO | 2008063625 A2 | | 5/2008 |
| ZA | 8 302 947 A | | 3/1984 |

OTHER PUBLICATIONS

Database WPI Week 198426 Thomson Scientific, London, GB; AN 1984-165127.

* cited by examiner

*Primary Examiner* — John Cooney
(74) *Attorney, Agent, or Firm* — Brooks Kushman P.C.

(57) ABSTRACT

Antifoam particles contain: (A) porous copolymers of urea or melamine or a mixture thereof with an alkanal, and (B) a silicone antifoam composition which is liquid at 0° C. The invention also provides pulverulent antifoam agents which comprise antifoam particles and optionally further carrier materials.

15 Claims, No Drawings

SILICONE ANTIFOAM PARTICLES

CROSS-REFERENCE TO RELATED APPLICATIONS

This application claims priority to German Patent Application No. DE 10 2009 003 187.1 filed May 18, 2009, which is herein incorporated by reference.

BACKGROUND OF THE INVENTION

1. Field of the Invention

The invention relates to antifoam particles comprising porous copolymers of urea or melamine or of mixtures thereof with an alkanal, and a liquid silicone antifoam composition.

2. Background Art

Pulverulent silicone antifoam agents are known. They may be composed of different carrier materials, suitable for the different applications, and are used, for example, for foam control in powder detergents, as an ingredient in agrochemicals, and in redispersible polymer powders for treating construction materials.

DE 69421462 T2 describes particulate foam control agents in which the silicone antifoam agent has been applied to a zeolite carrier and surrounded with a polycarboxylate encapsulant. To protect the silicone antifoam agent from the alkaline medium of the zeolite carrier, the carrier material must be given an application of an organopolysiloxane/polyoxyalkylene copolymer before the silicone antifoam agent is applied. A disadvantage of this procedure is a comparatively costly and inconvenient operation.

WO 2005/123892 A1 describes active ingredient particles which are composed of a core material consisting of fragrance, silicone fluid, wax, hydrocarbons, higher fatty acids, oil essences, lipids, silicon dioxide particles, and similar active ingredients. Surrounding this core material is a shell material made from polymers such as polyureas, for example. The disadvantage here is that a costly and inconvenient operation is necessary for encapsulating the particle comprising active ingredient, and in some cases this operation has to be carried out at increased temperature.

WO 2008/063625 A1 describes a particle composition composed of one or more particles with a core material and a shell. The core material may be inter alia silicone fluid, silicon dioxide particles, foam control agents or defoamers; the shell material may be inter alia polyurea. Here, again, the polyurea serves for enveloping the particles, and not as a carrier material for the silicone fluid. The process used for producing the encapsulated materials is costly and inconvenient.

SUMMARY OF THE INVENTION

The invention provides antifoam particles (P) comprising
(A) a porous copolymer of urea or melamine or a mixture thereof with an alkanal, and
(B) a silicone antifoam composition which is liquid at 0° C.

DETAILED DESCRIPTION OF THE PREFERRED EMBODIMENT(S)

The copolymer (A) is a porous carrier material which takes up the liquid silicone antifoam composition (B) very well and immediately releases it again, slowly and uniformly, in aqueous systems. Consequently the silicone antifoam composition (B) can be used at low concentration, in laundry detergents, for example. In this way, the antifoam composition (B) is released early in the early stage of the laundering operation.

The antifoam particles (P) give rise to free-flowing, non-caking granules which exhibit outstanding storage stability. The antifoam particles (P) are very highly compatible with other porous carrier materials and can be blended with them to give a pulverulent antifoam agent. The activity of the pulverulent antifoam agent is also retained for a number of months, even after storage at elevated temperature and increased atmospheric humidity, in a pulverulent detergent matrix, for example.

The copolymer (A) is preferably a condensation product of urea or melamine or of mixtures thereof with an alkanal of the general formula (1)

$$O=CH-R^* \qquad (1),$$

where
R* is a hydrogen atom or an alkyl radical having 1 to 6 C atoms. Preferably R* is a hydrogen atom or a methyl radical.

If urea is used when preparing copolymer (A), it is preferred to use at least 1.05 mol, more preferably at least 1.1 mol, of alkanal of the general formula (1), and preferably not more than 1.5 mol, more preferably not more than 1.4 mol, of alkanal, per mol of urea.

If melamine is used in the preparation of copolymer (A), it is preferred to use at least 0.7 mol, more preferably at least 0.8 mol, of alkanal of the general formula (1), and preferably not more than 1.0 mol, more preferably not more than 0.9 mol of alkanal, per mol of melamine.

If a mixture of melamine with an alkanal is used when preparing copolymer (A), it is preferred to use at least 10 parts, more preferably at least 30 parts, and with particular preference at least 50 parts by weight of alkanal, and preferably not more than 500 parts, more preferably not more than 300 parts, and with particular preference not more than 200 parts by weight of alkanal per 100 parts by weight of melamine.

Preferably, it is possible for 100 g of copolymer (A) to take up at least 100 cm³, more preferably at least 200 cm³, of liquid antifoam composition (B) at 20° C. and 1 bar.

One particularly preferred copolymer (A) is the urea-formaldehyde copolymer available as Pergopak® M from Albemarle Corp.

The copolymer (A) preferably has a density of 1.3-1.6 g/cm³. The copolymer (A) is preferably in the form of granules having a bulk density of 60 to 80 kg/m³. The size of the primary particles is preferably at least in the region of 0.05 µm, more particularly at least 0.1 µm, and preferably not more than 2, more preferably not more than 1, and most preferably not more than 0.5 µm. The primary particles preferably undergo agglomeration to form larger particles, with 80%, more preferably 90%, of the particles being situated preferably in the 20-35 µm range.

As a silicone antifoam composition (B) which is liquid at 0° C. it is possible to use typical silicone antifoam compositions, as described in EP 301531 A and EP 1781393 A, for example.

Preferred silicone antifoam compositions (B) comprise at least one organosilicon compound (C) which has units of the general formula (2)

$$R_a(R^1O)_b R^2{}_c SiO_{(4-a-b-c)/2} \qquad (2),$$

in which
R is hydrogen or a monovalent, SiC-bonded, optionally substituted aliphatic hydrocarbon radical, or aromatic hydrocarbon radical attached to the silicon atom via aliphatic groups, the radical having 1 to 18 C atoms, $R^1$ is hydrogen or a monovalent, optionally substituted hydrocarbon radical having 1 to 30 C atoms, $R^2$ is a monovalent, optionally substituted aromatic hydrocarbon radical having 6 to 18 C atoms, attached to the silicon atom via a ring carbon atom, and a, b, and c are 0, 1, 2 or 3, with the proviso that the sum a+b+c is less than or equal to 3 and, per molecule, in 1-100%, preferably in 10-60%, and more preferably in 20-40% of all the units of the general formula (2) c is other than 0, and in at least 50% of all the units of the general formula (2) in the organosilicon compound the sum a+b+c is 2.

Preferred silicone antifoam compositions (B) comprise at least one additive (D) selected from (D1) filler particles and (D2) organopolysiloxane resins comprising units of the general formula (3)

$$R^3_d(R^4O)_e SiO_{(4-d-e)/2} \qquad (3),$$

in which $R^3$ and $R^4$ are each hydrogen or a monovalent, optionally substituted hydrocarbon radical having 1 to 18 C atoms, and d and e denote the values 0, 1, 2 or 3, with the proviso that the sum d+e is 3, and in less than 50% of all the units of the general formula (3) in the organopolysiloxane resin the sum d+e is 2.

Preferred silicone antifoam compositions (B) comprise an organosilicon compound (E) which has units of the general formula (4)

$$R^5_g(R^6O)_h SiO_{(4-g-h)/2} \qquad (4),$$

in which $R^5$ has a definition given for R, $R^6$ has a definition given for $R^1$, and g and h are 0, 1, 2 or 3, with the proviso that the sum g+h is $\leq 3$, and in at least 50% of all the units of the general formula (4) in the organosilicon compound the sum g+h is 2.

In one preferred variant, component (A) comprises aromatic radicals attached directly to the silicon atom. In other words, there is a covalent bond between a silicon atom in the unit of the general formula (2) and a carbon atom belonging to the aromatic ring.

Examples of radicals R are alkyl radicals such as the methyl, ethyl, n-propyl, isopropyl, n-butyl, isobutyl, tert-butyl n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radicals; cycloalkyl radicals such as the cyclopentyl, cyclohexyl, cycloheptyl and methylcyclohexyl radicals, and aromatic groups attached via aliphatic groups to the silicon atom such as the benzyl radical, the phenylethyl radical or the 2-phenylpropyl radical.

Examples of substituted radicals R are 3,3,3-trifluoro-n-propyl radical, cyanoethyl, glycidyloxy-n-propyl, polyalkylene glycol-n-propyl, amino-n-propyl, aminoethylamino-n-propyl, and methacryloyloxy-n-propyl radicals.

Radical R preferably comprises hydrogen or optionally substituted aliphatic hydrocarbon radicals having 1 to 10 carbon atoms, more preferably aliphatic hydrocarbon radicals having 1 to 4 carbon atoms, most preferably the methyl radical.

Examples of radical $R^1$ are hydrogen and the radicals specified for radicals R and W. Radical $R^1$ preferably comprises hydrogen or optionally substituted hydrocarbon radicals having 1 to 20 carbon atoms, more preferably hydrogen or hydrocarbon radicals having 1 to 4 carbon atoms, most preferably methyl or ethyl radicals.

Examples of $R^2$ are aryl radicals, such as phenyl, tolyl, xylyl, cumyl, naphthyl, and anthracyl radicals, preferably, the phenyl radical. Preferably 10% to 100%, more preferably 15% to 50%, of the SiC-bonded radicals in component (C) are radicals $R^2$.

Preferably b is 0 or 1, and preferably c is 0, 1 or 2. Preferably less than 5%, more preferably less than 1%, of the radicals R are hydrogen atoms.

The organosilicon compounds containing units of the general formula (2) that are used as component (C) are preferably branched or linear organopolysiloxanes, which with particular preference are composed of units of the general formula (2).

In the context of the present invention, the term "organopolysiloxanes" should be taken to include polymeric, oligomeric, and dimeric siloxanes.

Examples of component (C) are those composed of units $Ph_3SiO_{1/2}$, $Ph_2MeSiO_{1/2}$, $PhMe_2SiO_{1/2}$, $Ph_2SiO_{2/2}$, $PhMeSiO_{2/2}$, and $PhSiO_{3/2}$, where Me is methyl radical and Ph is phenyl radical, such as, for example, linear polysiloxanes of the formulae $Me_3SiO(Ph_2SiO)_x(Me_2SiO)_z SiMe_3$, $Me_3SiO(PhMeSiO)_y(Me_2SiO)_z SiMe_3$, $Me_3SiO(Ph_2SiO)_x(PhMeSiO)_y(Me_2SiO)_z SiMe_3$, and $Me_3SiO(Ph_2SiO)_x(Me_2SiO)_z SiMe_3$, and also branched polysiloxanes of the formulae $MeSi[O(Ph_2SiO)_x(Me_2SiO)_z SiMe_3]_3$, $PhSi[O(PhMeSiO)_y(Me_2SiO)_z SiMe_3]_3$, and $Me_3SiO(Me_2SiO)_z[PhSiO(OMe_2SiO)_z SiMe_3]_v(Me_2SiO)_z SiMe_3$, the coefficients v, x, and y adopting values of greater than or equal to 1, and z being 0 or greater than or equal to 1. The sum of v, x, y, and z determines the degree of polymerization; v defines the number of branches, and hence the viscosity.

The organosilicon compounds (C) preferably have a viscosity of at least 10, more preferably at least 100, and most preferably at least 500 mPas and preferably not more than 1,000,000, more preferably not more than 50,000, most preferably not more than 5000 mPas, measured in each case at 25° C.

The organosilicon compounds (C) are commercially available products and/or can be prepared by any desired methods known to date in organosilicon chemistry, as for example by cohydrolysis of the corresponding silanes.

The silicone antifoam compositions (B) comprise additive (D) in amounts of preferably at least 0.1, more preferably at least 1 part by weight, and preferably not more than 30, more preferably not more than 15 parts by weight, based in each case on 100 parts by weight of component (C).

Additive (D) used may be exclusively component (D1), exclusively component (D2), or a mixture of components (D1) and (D2), the latter being preferred. Component (D1) preferably comprises pulverulent fillers, more preferably pulverulent hydrophobic fillers. Component (D1) preferably has a BET surface area of 20 to 1000 $m^2/g$, a particle size of less than 10 μm, and an agglomerate size of less than 100 μm.

Examples of component (D1) are silicon dioxide (silicas), titanium dioxide, aluminum oxide, metal soaps, finely ground quartz, PTFE powders, fatty acid amides, e.g., ethylenebisstearamide, and finely divided hydrophobic polyurethanes. As component (D1) it is preferred to use silicon dioxide (silicas), titanium dioxide or aluminum oxide having a BET surface area of 20 to 1000 $m^2/g$, a particle size of less than 10 μm, and an agglomerate size of less than 100 μm. Particularly preferred as component (D1) are silicas, more particularly those having a BET surface area of 50 to 800 m²/g. These silicas may be fumed or precipitated silicas. As component (D1) it is possible to employ both pretreated silicas, i.e., commercially available hydrophobic silicas, and hydrophilic silicas.

Examples of hydrophobic silicas that can be used in accordance with the invention are HDK® H2000, a fumed, hexamethyldisilazane-treated silica having a BET surface area of 140 m²/g (available commercially from Wacker-Chemie AG, Germany), and a precipitated, polydimethylsiloxane-treated silica having a BET surface area of 90 m²/g (available commercially under the name "Sipernat® D10" from Degussa AG, Germany). If hydrophobic silicas are to be used as component (D1), it is also possible for hydrophilic silicas to be hydrophobized in situ, if this is advantageous for the desired activity of the defoamer formulation.

Examples of radical $R^3$ are hydrogen and the radicals specified for radical R and $R^2$. Preferably, radical $R^3$ comprises optionally substituted hydrocarbon radicals having 1 to 20 carbon atoms, more preferably hydrocarbon radicals having 1 to 6 carbon atoms, most preferably the methyl radical.

Examples of radical $R^4$ are the radicals specified for radical $R^1$. Preferably, radical $R^4$ comprises hydrogen or hydrocarbon radicals having 1 to 4 carbon atoms, more preferably hydrogen, methyl radicals or ethyl radicals.

The value for d is preferably 3 or 0.

The optionally employed component (D2) preferably comprises silicone resins comprising units of the general formula (3) in which in less than 30%, preferably in less than 5%, of the units in the resin the sum d+e is 2. More preferably, component (D2) comprises organopolysiloxane resins composed to an extent of at least 90 mol % of $R^3_3SiO_{1/2}$ (M) and $SiO_{4/2}$ (Q) units, with $R^3$ being as defined above; these resins are also referred to as MQ resins. The molar ratio of M units to Q units is preferably in the range from 0.5 to 2.0, more preferably in the range from 0.6 to 1.0. These silicone resins may also contain up to 10% by weight of free hydroxyl or alkoxy groups.

The organopolysiloxane resins (D2) preferably have a viscosity of more than 1000 mPas, or are solids, at 25° C. The weight-average molecular weight as determined by gel permeation chromatography (relative to a polystyrene standard) of these resins is preferably at least 200 g/mol, more preferably at least 1000 g/mol, and preferably not more than 200,000 g/mol, more preferably not more than 20,000 g/mol. Components (D2) are commercially available products and/or can be prepared by processes which are commonplace within silicon chemistry, as for example in accordance with EP-A 927 733.

If the additive (D) comprises a mixture of components (D1) and (D2), then the weight ratio of (D1) to (D2) in the mixture is preferably 0.01 to 50, more preferably 0.1 to 7.

Examples of radicals $R^5$ are the examples given for radical R. Preferably radical $R^5$ comprises hydrogen or optionally substituted aliphatic hydrocarbon radicals having 1 to 20 carbon atoms, more preferably aliphatic hydrocarbon radicals having 1 to 4 carbon atoms, and most preferably the methyl radical.

Examples of radical $R^6$ are hydrogen and the radicals specified for radical R and $R^2$. Preferably radical $R^6$ comprises hydrogen or optionally substituted hydrocarbon radicals having 1 to 20 carbon atoms, more preferably hydrogen or hydrocarbon radicals having 1 to 4 carbon atoms, and most preferably methyl or ethyl radicals.

The optionally employed organopolysiloxanes (C) preferably have a viscosity of 10 to 1,000,000 mm²/s at 25° C.

In optional component (E), the value of g is preferably 1, 2 or 3, and the value of h is preferably 0 or 1. Examples of optionally employed component (E) are the examples given for component (A); this organosilicon compound contains no aromatic radicals $R^2$ attached directly to silicon, for instance, polydimethylsiloxanes having viscosities of 100 to 1,000,000 mPa·s at 25° C. These polydimethylsiloxanes may be branched, for example, as a result of the incorporation of $R^5SiO_{3/2}$ or $SiO_{4/2}$ units, up to a maximum of 5% of all the units. These branched or partly crosslinked siloxanes then have viscoelastic properties.

The optionally employed component (E) preferably contains at least 90 mol %, more particularly at least 95 mol %, of units $R^5_2SiO_{2/2}$. Particular preference is given to polydimethylsiloxanes, which may be terminated by silanol groups and/or by alkoxy groups and/or by trimethylsiloxy groups, or to siloxanes having polyether groups. Polyether-modified polysiloxanes of this kind are known and are described in EP-A 1076073, for example.

With particular preference component (E) comprises organosilicon compounds comprising units of the general formula (4) in which $R^5$ is a methyl radical and $R^6$ is a linear and/or branched hydrocarbon radical having at least 6 carbon atoms, h adopts an average value of 0.005 to 0.5, and the sum (g+h) has an average value of 1.9 to 2.1. Products of this kind are accessible, for example, through alkali-catalyzed condensation of silanol-terminated polydimethylsiloxanes with a viscosity of 50 to 50,000 mPa·s at 25° C., and aliphatic alcohols having more than 6 carbon atoms, such as isotridecyl alcohol, n-octanol, stearyl alcohol, 4-ethylhexadecanol or eicosanol.

If the silicone antifoam composition (B) comprises component (E), the amounts are preferably at least 1 part and with particular preference at least 2 parts by weight, and preferably not more than 900, more preferably not more than 100, most preferably not more than 10 parts by weight, based in each case on 100 parts by weight of component (C). Components (E) are commercially available products and/or can be prepared by processes which are commonplace in silicon chemistry.

Aside from components (C), (D), and, optionally, (E), the silicone antifoam compositions (B) may comprise all further substances of the kind that have already been used to date in defoamer formulations, such as organic compounds (F) which have a solubility of not more than 2 percent by weight in water at 25° C. under a pressure of 1013.25 hPa.

The optionally employed component (F) preferably comprises organic compounds having a boiling point of greater than 100° C. under the pressure of the surrounding atmosphere, i.e., at 900 to 1100 hPa, and more particularly compounds such as those selected from mineral oils, natural oils, isoparaffins, polyisobutylenes, residues from the oxo process for alcohol synthesis, esters of low molecular weight synthetic carboxylic acids, fatty acid esters such as octyl stearate and dodecyl palmitate, fatty alcohols, ethers of low molecular weight alcohols, phthalates, esters of phosphoric acid, and waxes.

The silicone antifoam compositions (B) preferably comprise organic compound (F) in amounts of not more than 1000 parts by weight, more preferably not more than 100, parts by weight, based in each case on 100 parts by weight of the total weight of components (C), (D), and, optionally, (E).

The silicone antifoam compositions (B) are preferably compositions comprising
100 parts by weight of an organosilicon compound (C),
0.1 to 30 parts by weight of one or more additives selected from (D1) and (D2), optionally
1 to 900 parts by weight of organosilicon compounds (E), and
optionally
0 to 10,000, more preferably 0 to 1000 parts by weight of organic compound (F).

The silicone antifoam compositions (B) are preferably viscous liquids which are clear to opaque and colorless to brownish. The silicone antifoam compositions (B) preferably have a viscosity of at least 10 mPas, more preferably at least 2000 mPas, and preferably not more than 2,000,000 mPas, more preferably not more than 50,000 mPas, in each case at 25° C. The silicone antifoam compositions (B) may be solutions or dispersions.

Where the silicone antifoam compositions (B) are emulsions, it is possible to use any emulsifiers known to the skilled person for the preparation of silicone emulsions, examples being anionic, cationic or nonionic emulsifiers. Preference is given to using emulsifier mixtures, which ought to include at least one nonionic emulsifier, such as sorbitan fatty acid esters, ethoxylated sorbitan fatty acid esters, ethoxylated fatty acids, ethoxylated linear or branched alcohols having 10 to 20 carbon atoms, and/or glycerol esters, for example. As thickeners, furthermore, it is possible to add known compounds, such as polyacrylic acid, polyacrylates, cellulose ethers such as carboxymethylcellulose and hydroxethylcellulose, natural gums such as xanthan gum, and polyurethanes, and also preservatives and other customary adjuvants known to the skilled person.

The continuous phase of the emulsions is preferably water. However, silicone antifoam compositions (B) in the form of emulsions can also be prepared in which the continuous phase is formed by components (C), (D), and optionally (E), or is formed by component (F). The emulsions in question may also be multiple emulsions. Where the silicone antifoam composition (B) comprises an emulsion, preference is given to oil-in-water emulsions containing 5% to 50% by weight of components (C) to (F), 1% to 20% by weight of emulsifiers and thickeners, and 30% to 94% by weight of water.

The invention also provides pulverulent antifoam agents which comprise antifoam particles (P) and also further carrier materials. The antifoam particles (P) can be blended with further carrier materials in order to adjust the powder properties such as, for example, composition, bulk density, particle size distribution, and angle of repose. If the pulverulent antifoam agent is to be used in a powder detergent, the bulk density of the pulverulent antifoam agent preferably corresponds to the bulk density of the powder detergent, in order to counteract separation between antifoam powder and detergent, as would occur if there were large differences in the bulk densities of the two components.

In one particularly advantageous process for preparing the pulverulent antifoam agent, the liquid silicone antifoam composition (B) is added, and more particularly applied by spraying, to the mixture of copolymer (A) and further carrier materials. This produces antifoam particles (P), since copolymer (A) absorbs the liquid silicone antifoam composition (B) very strongly.

Further carrier materials encompass water-soluble, water-insoluble, and water-dispersible materials. Examples of carrier materials are sulfates, carbonates, phosphates, polyphosphates, silicon dioxide types, silicates, clays, starches, cellulose materials, and aluminosilicates.

All above symbols in the above formulae have their definitions in each case independently of one another. In all formulae the silicon atom is tetravalent.

In the examples below, unless otherwise indicated in each case, all amounts and all percentages are by weight, all pressures are 0.10 MPa (abs.), and all temperatures are 20° C.

Production of an Antifoam Powder

In a 500 ml beaker, 127.5 g of the solid constituents are introduced as a carrier powder, and this mixture is homogenized using a paddle stirrer. Then 22.5 g (15%) of liquid silicone antifoam composition, at a temperature of approximately 80° C., are incorporated by stirring and homogenized thoroughly.

Foam Testing in a Washing Machine

The foam-suppressing effect of the antifoam powders was tested in a commercially available washing machine. Testing took place in a Miele Novotronic W 918 washing machine. 130 g of commercially available, defoamer-free powder detergent were combined with 1.69 g (1.3%) of antifoam powder. The development of foam by this powder mixture was tested in the main wash cycle, together with 3.5 kg of clean cotton laundry, at a temperature of 40° C. and a water hardness of 3° GH. The height of the washing machine's viewing window was divided into 6 parts of equal height. The foam produced during the laundering operation was read off with a grading from 0 to 6, with 0 corresponding to absence of foam and 6 to a maximum quantity of foam.

Conditioned Storage of Laundry Powder Formulations with Antifoam Powder

The mixtures of powder detergent with antifoam powder were stored at 35° C. and 70% relative atmospheric humidity. The composition of the antifoam powders was as follows:

Comparative Example C (Not Inventive)

40% sodium hydrogen carbonate
45% potato starch
15% liquid silicone antifoam composition Example A 35% sodium hydrogen carbonate
45% potato starch
5% Pergopak® M from Albemarle Corp.
15% liquid silicone antifoam composition Example B 80% sodium hydrogen carbonate
5% Pergopak® M from Albemarle Corp.
15% liquid silicone antifoam composition Example C 70% sodium hydrogen carbonate
10% Aeromyl 115
5% Pergopak® M from Albemarle Corp.
15% liquid silicone antifoam composition Example D 53% sodium hydrogen carbonate
27% Aeromyl 115
5% Pergopak® M from Albemarle Corp.
15% liquid silicone antifoam composition Example E 40% sodium hydrogen carbonate
40% sodium sulfate
5% Pergopak® M from Albemarle Corp.
15% liquid silicone antifoam composition

TABLE 1

| Example | Angle of repose | Bulk density | Period of conditioned storage | Average foam development during laundering operation (0-6) | | |
|---|---|---|---|---|---|---|
| | | | | after 0-20 minutes | after 21-40 minutes | after 41-55 minutes |
| C* | n.m.** | n.m.** | — | — | — | — |
| A | 35.8 | 0.62 | 4 weeks | 0 | 0 | 0.9 |
| B | 38.7 | 0.91 | 4 weeks | 0 | 0.1 | 1.9 |
| | | | 8 weeks | 0 | 0.3 | 2.8 |
| C | 35.8° | 0.88 | 4 weeks | 0 | 0.1 | 1 |
| | | | 8 weeks | 0 | 0 | 0.6 |
| D | 36.5° | 0.72 | 4 weeks | 0 | 0.4 | 2.4 |
| | | | 8 weeks | 0 | 0.2 | 1.8 |
| E | 37.2° | 0.95 | 4 weeks | 0 | 0 | 0.7 |
| | | | 8 weeks | 0 | 0.2 | 0.9 |

*not inventive
**powder not free-flowing

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Free-flowing, pulverulent antifoam particles, comprising:
   (A) at least one porous copolymer of urea, melamine, or a mixture thereof with an alkanal, and
   (B) at least one silicone antifoam composition which is liquid at 0° C., wherein the at least one silicone antifoam composition (B) is absorbed in the at least one porous copolymer (A) in an amount of at least 100 cm³ of (B) per 100 g (A) at 20° C. and 1 bar.

2. The antifoam particles of claim 1, wherein the copolymer (A) is a condensation product of urea, melamine or a mixture thereof with an alkanal of the formula (1)

O=CH—R*    (1), where
R* is hydrogen or an alkyl radical having 1 to 6 C atoms.

3. The antifoam particles of claim 1, wherein 100 g of copolymer (A) contains at least 200 cm³ of liquid antifoam composition (B) at 20° C. and 1 bar.

4. The antifoam particles of claim 2, wherein 100 g of copolymer (A) contains at least 200 cm³ of liquid antifoam composition (B) at 20° C. and 1 bar.

5. The antifoam particles of claim 1, wherein silicone antifoam composition (B) comprises at least one organosilicon compound (C) which comprises units of the formula (2)

$R_a(R^1O)_b R^2_c SiO_{(4-a-b-c)/2}$    (2), in which
R is hydrogen or a monovalent, SiC-bonded, optionally substituted aliphatic hydrocarbon radical, or an aromatic hydrocarbon radical attached to the silicon atom via aliphatic groups, said radicals having 1 to 18 C atoms,
$R^1$ is hydrogen or a monovalent, optionally substituted hydrocarbon radical having 1 to 30 C atoms,
$R^2$ is a monovalent, optionally substituted aromatic hydrocarbon radical having 6 to 18 C atoms, attached to silicon via a ring carbon atom, and
a, b, and c are 0, 1, 2 or 3,
with the proviso that the sum a+b+c is less than or equal to 3 and, per molecule, in 1-100%, of all the units of the formula (2), c is other than 0, and in at least 50% of all the units of the general formula (2) in the organosilicon compound the sum a+b+c is 2.

6. The antifoam particles of claim 1, wherein silicone antifoam composition (B) comprises at least one organosilicon compound (C) which comprises units of the formula (2)

$R_a(R^1O)_b R^2_c SiO_{(4-a-b-c)/2}$    (2), in which
R is hydrogen or a monovalent, SiC-bonded, optionally substituted aliphatic hydrocarbon radical, or an aromatic hydrocarbon radical attached to the silicon atom via aliphatic groups, said radicals having 1 to 18 C atoms,
$R^1$ is hydrogen or a monovalent, optionally substituted hydrocarbon radical having 1 to 30 C atoms,
$R^2$ is a monovalent, optionally substituted aromatic hydrocarbon radical having 6 to 18 C atoms, attached to silicon via a ring carbon atom, and
a, b, and c are 0, 1, 2 or 3,
with the proviso that the sum a+b+c is less than or equal to 3 and, per molecule, in 10-60%, of all the units of the formula (2), c is other than 0, and in at least 50% of all the units of the general formula (2) in the organosilicon compound the sum a+b+c is 2.

7. The antifoam particles of claim 1, wherein silicone antifoam composition (B) comprises at least one organosilicon compound (C) which comprises units of the formula (2)

$R_a(R^1O)_b R^2_c SiO_{(4-a-b-c)/2}$    (2), in which
R is hydrogen or a monovalent, SiC-bonded, optionally substituted aliphatic hydrocarbon radical, or an aromatic hydrocarbon radical attached to the silicon atom via aliphatic groups, said radicals having 1 to 18 C atoms,
$R^1$ is hydrogen or a monovalent, optionally substituted hydrocarbon radical having 1 to 30 C atoms,
$R^2$ is a monovalent, optionally substituted aromatic hydrocarbon radical having 6 to 18 C atoms, attached to silicon via a ring carbon atom, and
a, b, and c are 0, 1, 2 or 3,
with the proviso that the sum a+b+c is less than or equal to 3 and, per molecule, in 20-40%, of all the units of the formula (2), c is other than 0, and in at least 50% of all the units of the general formula (2) in the organosilicon compound the sum a+b+c is 2.

8. The antifoam particles of claim 1, wherein the silicone antifoam composition (B) comprises at least one additive (D1) or (D2);
(D1) filler particles and
(D2) organopolysiloxane resins comprising units of the formula (3)

$$R^3_d(R^4O)_e SiO_{(4-d-e)/2} \qquad (3),$$

in which
$R^3$ and $R^4$ are each hydrogen or a monovalent, optionally substituted hydrocarbon radical having 1 to 18 C atoms, and
d and e denote the values 0, 1, 2 or 3,
with the proviso that the sum d+e is $\leq 3$, and in less than 50% of all the units of the general formula (3) in the organopolysiloxane resin the sum d+e is 2.

9. The antifoam particles of claim 1, wherein the silicone antifoam composition (B) comprises an organosilicon compound (E) which comprises units of the formula (4)

$$R^5_g(R^6O)_h SiO_{(4-g-h)/2} \qquad (4),$$

in which
$R^5$ is hydrogen or a monovalent, SiC-bonded, optionally substituted aliphatic hydrocarbon radical, or an aromatic hydrocarbon radical attached to the silicon atom via aliphatic groups, said radicals having 1 to 18 C atoms,
$R^6$ is hydrogen or a monovalent, optionally substituted hydrocarbon radical having 1 to 30 C atoms,
g and h are 0, 1, 2 or 3,
with the proviso that the sum g+h is $\leq 3$, and in at least 50% of all the units of the general formula (4) in the organosilicon compound the sum g+h is 2.

10. A pulverulent antifoam agent which comprises antifoam particles of claim 1 and also further carrier materials.

11. The pulverulent antifoam agent of claim 10, wherein at least one further carrier material is selected from the group consisting of sulfates, carbonates, phosphates, polyphosphates, silicon dioxides, silicates, clays, starches, cellulose materials, and aluminosilicates.

12. The free flowing, pulverulent antifoam particles of claim 1, wherein the particles of the porous copolymer A have an average size within the range of 0.05 μm to 2 μm.

13. The free-flowing, pulverulent antifoam particles of claim 1, wherein the particles of the porous copolymer A have an average size within the range of 0.1 μm to 1 μm.

14. The free flowing, pulverulent antifoam particles of claim 1, wherein the particles of the porous copolymer A have an average size within the range of 0.1 μm to 0.5 μm.

15. The free-flowing, pulverulent antifoam particles of claim 5, wherein the silicone antifoam which is a liquid contains 100 parts by weight of organosilicon compound (C), 0.1 to 30 parts by weight relative to 100 parts (C) of one or more additives (D1) and/or (D2), where additives (D1) are filler particles and additives (D2) are organopolysiloxane resins comprising units of the formula (3)

$$R^3_d(R^4O)_e SiO_{(4-d-e)/2} \qquad (3),$$

in which
$R^3$ and $R^4$ are each hydrogen or a monovalent, optionally substituted hydrocarbon radical having 1 to 18 C atoms, and
d and e denote the values 0, 1, 2 or 3,
with the proviso that the sum d+e is $\leq 3$, and in less than 50% of all the units of the general formula (3) in the organopolysiloxane resin the sum d+e is 2;
1-900 parts relative to 100 parts (C) of organosilicon compounds (E) which comprise units of the formula (4)

$$R^5_g(R^6O)_h SiO_{(4-g-h)/2} \qquad (4),$$

in which
$R^5$ is hydrogen or a monovalent, SiC-bonded, optionally substituted aliphatic hydrocarbon radical, or an aromatic hydrocarbon radical attached to the silicon atom via aliphatic groups, said radicals having 1 to 18 C atoms,
$R^6$ is hydrogen or a monovalent, optionally substituted hydrocarbon radical having 1 to 30 C atoms,
g and h are 0, 1, 2 or 3,
with the proviso that the sum g+h is $\leq 3$, and in at least 50% of all the units of the general formula (4) in the organosilicon compound the sum g+h is 2, and optionally,
0-10,000 parts by weight relative to 100 parts of organosilicon compound (C) of (F), a liquid organic compound having a boiling point greater than 100° C. under normal atmospheric pressure.

* * * * *